(12) United States Patent
Hawkes

(10) Patent No.: US 8,593,839 B2
(45) Date of Patent: Nov. 26, 2013

(54) ACCURACY OF A VOLT-SECOND CLAMP IN AN ISOLATED DC-DC CONVERTER

(75) Inventor: Charles Edward Hawkes, Cary, NC (US)

(73) Assignee: Linear Technology Corporation, Milpitas, CA (US)

( * ) Notice: Subject to any disclaimer, the term of this patent is extended or adjusted under 35 U.S.C. 154(b) by 410 days.

(21) Appl. No.: 12/882,806

(22) Filed: Sep. 15, 2010

(65) Prior Publication Data

US 2011/0063882 A1 Mar. 17, 2011

Related U.S. Application Data

(60) Provisional application No. 61/243,230, filed on Sep. 17, 2009.

(51) Int. Cl.
*G05F 5/04* (2006.01)
(52) U.S. Cl.
USPC ............ 363/56.11; 323/301; 363/21.05
(58) Field of Classification Search
USPC .......... 363/56.11, 21.05, 21.11, 56.05, 56.08; 323/301, 299
See application file for complete search history.

(56) References Cited

U.S. PATENT DOCUMENTS

| | | | |
|---|---|---|---|
| 4,477,867 A | 10/1984 | Pellegrino | |
| 4,794,508 A * | 12/1988 | Carroll | 363/95 |
| 5,187,384 A * | 2/1993 | Blockl | 327/190 |
| 5,552,979 A | 9/1996 | Gu et al. | |
| 6,650,553 B2 * | 11/2003 | Tsai | 363/21.07 |
| 8,139,384 B2 * | 3/2012 | Kung et al. | 363/97 |
| 2009/0161287 A1 * | 6/2009 | Kandah et al. | 361/263 |

FOREIGN PATENT DOCUMENTS

WO WO 02/07296 A1 1/2002

OTHER PUBLICATIONS

European Search Report issued in European Patent Application No. 10009842.5-2207, mailed Feb. 3, 2011.

* cited by examiner

*Primary Examiner* — Harry Behm
(74) *Attorney, Agent, or Firm* — McDermott Will & Emery LLP

(57) ABSTRACT

A novel system and methodology for providing a volt-second clamp. A DC/DC conversion system configured for producing an output voltage in response to an input voltage has a transformer with a primary winding responsive to the input voltage and a secondary winding for producing the output voltage. The conversion system has a power switch coupled to the primary winding of the transformer and controlled with a converter control signal, such as a PWM control signal. The power switch is further controlled by a comparator that compares an input value supplied to its input with a variable reference value so as to prevent magnetic flux density of the transformer from increasing to an undesired level. The input value of the comparator is produced by a comparator input circuit as a function of the input voltage and an on-time of the power switch. A reference circuit produces the reference value that varies as a function of the input voltage.

19 Claims, 3 Drawing Sheets

BACKGROUND

BACKGROUND

BACKGROUND

ACCURACY OF A VOLT-SECOND CLAMP IN AN ISOLATED DC-DC CONVERTER

This application claims priority of provisional U.S. patent application No. 61/243,230 filed on Sep. 17, 2009 and entitled "METHOD TO IMPROVE THE ACCURACY OF A VOLT-SECOND CLAMP IN AN ISOLATED DC/DC CONVERTER."

TECHNICAL FIELD

This disclosure relates to power supply systems, and more particularly, to circuitry and methodology for providing a volt-second clamp in an isolated DC/DC converter.

BACKGROUND ART

An isolated DC/DC converter uses power transformer windings to provide voltage conversion and galvanic isolation for the load. A volt-second clamp is commonly used in isolated DC/DC converters to limit the excursion of the magnetic flux density in the power transformer that occurs when voltage is applied. If a given voltage is applied for a long period of time, then the magnetic flux density will increase to the point of saturation, with potentially damaging results to the DC/DC converter. Typically, the volt-second clamp is provided in a pulse width modulation (PWM) controller, which is used to control the power switches that apply voltage to the power transformer.

FIG. 1 shows a conventional isolated DC/DC converter having a power transformer T1. An input voltage $V_{IN}$ is supplied to the primary winding of the transformer T1 to provide an output voltage Vout to a load coupled to the secondary winding of the transformer T1. A volt-second clamp circuit 10 is provided on a PWM controller integrated circuit (IC) used to control a power switch M1 that applies voltage to the power transformer T1. The volt-second clamp circuit 10 comprises a voltage comparator U1 used to limit the on-time of the power switch M1. When the volt-second limit has been reached, M1 will be turned off, even if the PWM signal is still high. When the power switch M1 is on and voltage is being applied to the transformer T1, switch M2 coupled to the positive input of the comparator U1 will be off and an external RC charging circuit is allowed to charge, increasing the voltage on the positive input of the comparator U1. If this voltage increases above the reference level $V_R$, the comparator output goes high, indicating that the volt-second limit has been reached. The comparator output signal resets latch U2 coupled via AND gate G1 to the switch M1, causing M1 to turn off. When M1 is off, switch M2 controlled via inverter G2 discharges the capacitor C in the RC charging circuit.

In the volt-second circuit 10, the on-time of the switch M1 is therefore limited to an amount of volt-second clamp time $t_{CL}$ given by:

$$t_{CL} = RC \cdot \ln\left(\frac{V_{IN}}{V_{IN} - V_R}\right),$$

where R and C are values of resistor R and capacitor C in the RC charging circuit. This expression can be expanded as:

$$t_{CL} = RC \cdot \left[\left(\frac{V_R}{V_{IN}}\right) + \frac{1}{2}\left(\frac{V_R}{V_{IN}}\right)^2 + \frac{1}{3}\left(\frac{V_R}{V_{IN}}\right)^3 + \ldots\right].$$

If $V_{IN} \gg V_R$, then this can be approximated with the first order term as:

$$t_{CL} = RC \cdot \left(\frac{V_R}{V_{IN}}\right).$$

In the above equation, the volt-second clamp time $t_{CL}$ is inversely proportional to transformer voltage $V_{IN}$. Therefore, for a given value of $V_R$, R and C, the product of $t_{CL}$ and $V_{IN}$ will be constant, meaning that the maximum allowed volt-second product on the transformer will also be constant as $V_{IN}$ is varied. Since the resistor and capacitor are external to the PWM controller IC, the overall accuracy of the volt-second clamp can be very good. Typically the accuracy of the reference and comparator are excellent (1% or better), and any variation in circuit delay is small relative to the volt-second clamp time (3% or less). Consequently, the accuracy of the volt-second clamp can readily be 5% or better, depending on the tolerance of the external resistor and capacitor.

In some applications, however, it is not the case that $V_{IN} \gg V_R$. As a result, there can be substantial errors in the above volt-second clamp as the input voltage is varied. For example, if the volt-second clamp resides on the primary side of the DC/DC converter, and the input voltage is relatively low, such errors will be present. This will also be a problem if the volt-second clamp resides on the secondary side of the DC/DC converter, and the output voltage is relatively low.

This case is illustrated in FIG. 2, that shows a conventional volt-second clamp circuit 20. The voltage $V_{SW}$ on the secondary side of the transformer T1 is used to feed the RC charging circuit. Diodes D1 and D2, inductor L and output capacitor Co are provided on the secondary side of the transformer T1. If the output voltage $V_{OUT}$ is low, then the voltage $V_{SW}$ will also be relatively low, thereby causing volt-second clamp inaccuracy. In either of these cases, the exponential nature of volt-second clamp as it is commonly used will result in substantial errors. Such degraded performance can compromise the ability of the volt-second clamp to prevent transformer core saturation.

One obvious solution is to decrease the value of the reference voltage $V_R$. However, the value of the reference voltage $V_R$ is practically limited to approximately 0.5V or greater in order to minimize inaccuracies arising from comparator offset voltage or from system noise. Therefore, this approach is not effective in improving the overall accuracy.

A second approach is to make use of a more complex volt-second clamp architecture that typically uses an analog multiplier/divider to create a current that is inversely proportional to the input voltage. This current is then used to charge a capacitor that resides within the PWM controller integrated circuit. Such a circuit is illustrated in FIG. 3.

In the circuit of FIG. 3, an external resistor divider composed of resistors R1, R2 is used to provide adjustability. A volt-second clamp circuit 30 in FIG. 3 includes an analog multiplier/divider circuit 22 that divides voltage value $V_{B1}$ by a voltage value produced at the node between resistors R1 and R2. The output of the multiplier/divider 22 controls transconductance amplifier $G_M$, coupled to the positive input of the comparator U1, together with switch M2 and integrated circuit capacitor C. Voltage $V_{B2}$ is supplied to the transconductance amplifier $G_M$. The on-time of the switch M1 is limited by the volt-second clamp time $$t_{CL} = C \cdot \left(\frac{V_{B1}V_R}{G_M V_{IN}}\right)\left(\frac{R2}{R1+R2}\right)$$

which results in the desired constant volt-second limit.

There are however, two significant disadvantages of the circuit in FIG. 3. First, the accuracy of the analog multiplier/divider circuit 22 is limited, especially when used over a wide range of inputs. Second, the tolerance of the integrated circuit capacitor C is very poor, generally 10-15%. As a result, the overall accuracy of the circuit 20 is likewise poor.

In order to remove the error associated with the capacitor tolerance, some solutions have included a feedback loop to adjust the value of the reference voltage $V_R$. Examples of these solutions can be seen in U.S. Pat. Nos. 5,710,697 and 6,922,356. While these solutions can provide reasonably good accuracy, they suffer from the delay time associated with a feedback loop. This long delay time can result in a failure to limit the volt-second product applied to the transformer T for a period of time, potentially resulting in core saturation. In addition, the use of the feedback loop in addition to the analog multiplier/divider results in a substantially complex system.

Hence, there is a need for a technique that would improve accuracy of the volt-second clamp without disadvantages of prior art solutions discussed above.

SUMMARY OF THE DISCLOSURE

The present disclosure offers a novel system and methodology for providing the volt-second clamp. In accordance with one aspect of the disclosure, a DC/DC conversion system configured for producing an output voltage in response to an input voltage has a transformer with a primary winding responsive to the input voltage, and a secondary winding for producing the output voltage. The conversion system comprises a power switch coupled to the primary winding of the transformer and controlled with a converter control signal, such as a PWM control signal. The power switch is further controlled by a comparator that compares an input value supplied to its input with a variable reference value so as to prevent magnetic flux density of the transformer from increasing to an undesired level. The input value of the comparator is produced by a comparator input circuit as a function of the input voltage and an on-time of the power switch. The variable reference value produced by a reference circuit varies as a function of the input voltage.

In accordance with an embodiment of the disclosure, the reference circuit may be configured for producing the variable reference value based on a reference adjustment value inversely proportional to the input voltage. For example, the reference adjustment value may be produced by dividing a pre-selected constant value by a value of the input voltage. The reference circuit may subtract the reference adjustment value from a fixed reference value to produce the variable reference value.

The comparator may be arranged on a chip, such as a converter controller chip, and the comparator input circuit may include a capacitor arranged externally with respect to the chip. A switch responsive to an output signal of the comparator may control charging and discharging of the capacitor.

In accordance with another aspect of the disclosure, a control system is offered for controlling a circuit having a transformer arranged between input circuitry and output circuitry to galvanically isolate the output circuitry from the input circuitry. The control system comprises a power switch controlled to apply voltage to the transformer, and a switch control circuit responsive to a difference between a variable control value and a variable reference value to control the power switch so as to control the voltage applied to the transformer. The control value is produced as a function of the voltage applied to the transformer and an on-time of the switch. The reference value varies as a function of the voltage applied to the transformer.

For example, the variable reference value may be produced by a reference circuit based on a reference adjustment value inversely proportional to the voltage applied to the transformer. The reference adjustment value may be generated by dividing a pre-selected constant value by a value of the voltage applied to the transformer. The reference adjustment value may be subtracted from a fixed reference value to produce the variable reference value.

The switch control circuit may be arranged on a chip, and the control value generating circuit may include a capacitor arranged externally with respect to the chip. The control value generating circuit may further include a switch responsive to an output signal of the switch control circuit to control charging of the capacitor.

In accordance with a method of the present disclosure, the following steps are carried out to limit magnetic flux density in a transformer used to galvanically isolate an output of a DC/DC converter from an input voltage:

producing a control value as a function of the input voltage and an on-time of a switch that controls the DC/DC converter, producing a variable reference value as a function of the input voltage, and based on a difference between the control value and the variable reference value, controlling supply of the input voltage to the transformer.

The variable reference value may be produced based on a reference adjustment value inversely proportional to the input voltage. The reference adjustment value may be generated by dividing a pre-selected constant value by the value of the input voltage. The variable reference value may be produced by subtracting the reference adjustment value from a fixed reference value.

Additional aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using an exemplary arrangement of a volt-second clamp circuit coupled to the primary winding of a power transformer in an isolated DC/DC converter. It will become apparent, however, that the concepts described herein are applicable to any volt-second clamp arrangement coupled to either a primary or a secondary winding of a transformer arranged in any circuit configuration.

Figure 4:
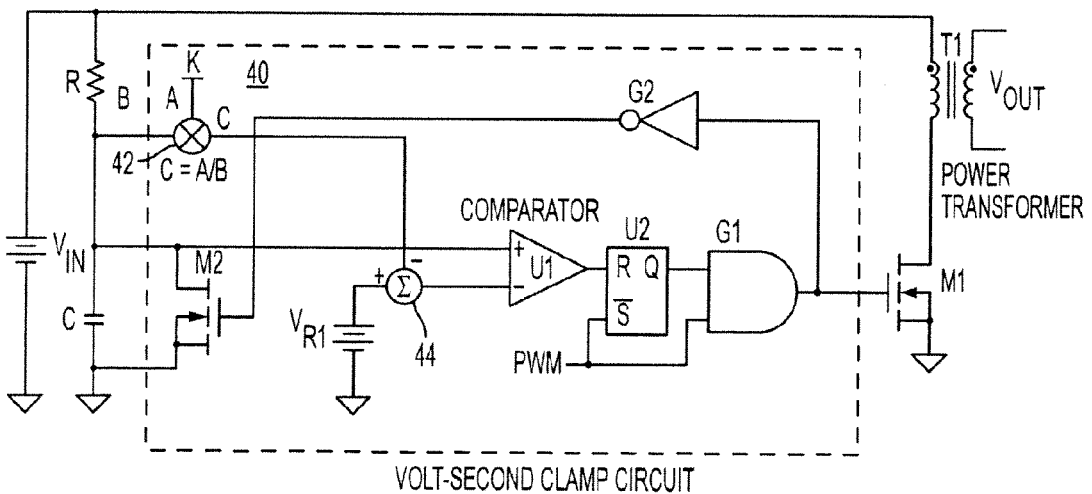
FIG. 4 is a circuit diagram illustrating a volt-second clamp circuit of the present disclosure.

FIG. 4 illustrates an exemplary embodiment of a volt-second clamp circuit 40 of the present disclosure. The volt-clamp circuit 40 may be provided on a converter controller IC, such as a PWM controller IC, configured for controlling an isolated DC/DC converter having a power transformer T1 that provides galvanic isolation of secondary side circuitry coupled to the secondary winding of the transformer T1 from primary side circuitry coupled to the primary winding of the transformer T1. A power switch M1, such as a MOSFET, may be coupled to the primary winding so as to allow input voltage $V_{IN}$ of the converter to apply to the transformer T1 when M1 is on.

The volt-second clamp circuit 40 may include a voltage comparator U1 for comparing a value at its positive input with a reference value at its negative input. The output of the comparator U1 is coupled to a reset input R of a latch U2. A set input S/ of the latch U2 is supplied with a PWM control signal. The output Q of the latch U2 is coupled to one input of an AND gate G1. Another input of the AND gate G1 is supplied with the PWM control signal. The output of the AND gate G1 is supplied to the switch M1 to control its switching. Via an inverter G2, the output signal of the AND gate G1 is also supplied to control switching of a switch M2 coupled to the positive input of the comparator U1. The switch M2 controls charging of an RC charging circuit composed of a resistor R and capacitor C arranged externally with respect to the converter controller IC. A node connecting the resistor R and capacitor C is coupled to the positive input of the comparator U1.

When the voltage to the transformer T1 is applied for too long, the magnetic flux density in the transformer T1 may increase to the point of saturation. To prevent the magnetic flux density from increasing to an undesirable level, the comparator U1 controls the switch M1 so as to limit the on-time of this switch. When in response to the PWM control signal, the switch M1 is on and voltage $V_{IN}$ is applied to the transformer T1, the switch M2 is off and the external RC circuit is allowed to charge, increasing the voltage at the positive input of the comparator U1. If this voltage exceeds a reference voltage supplied to the negative input of the comparator U1, the output of the comparator U1 goes high indicating that the volt-second limit has been reached. The output signal of the comparator U1 resets latch U2 that causes the switch M1 to turn off even if the PWM signal is still high. When the switch M1 is off, the switch M2 is on, discharging the capacitor C in the RC charging circuit coupled to the positive input of the comparator U1. Hence, the signal at the positive input of the comparator U1 is produced as a function of the input voltage $V_{IN}$ and the on-time of the switch M1.

In accordance with the present disclosure, a value of the reference voltage supplied to the negative input of the comparator U1 may vary as a function of the input voltage $V_{IN}$. In particular, as discussed below, a value of the reference voltage $V_R$ may correspond to a value of fixed reference voltage $V_{R1}$ adjusted by a value inversely proportional to the input voltage $V_{IN}$.

Figure 1:
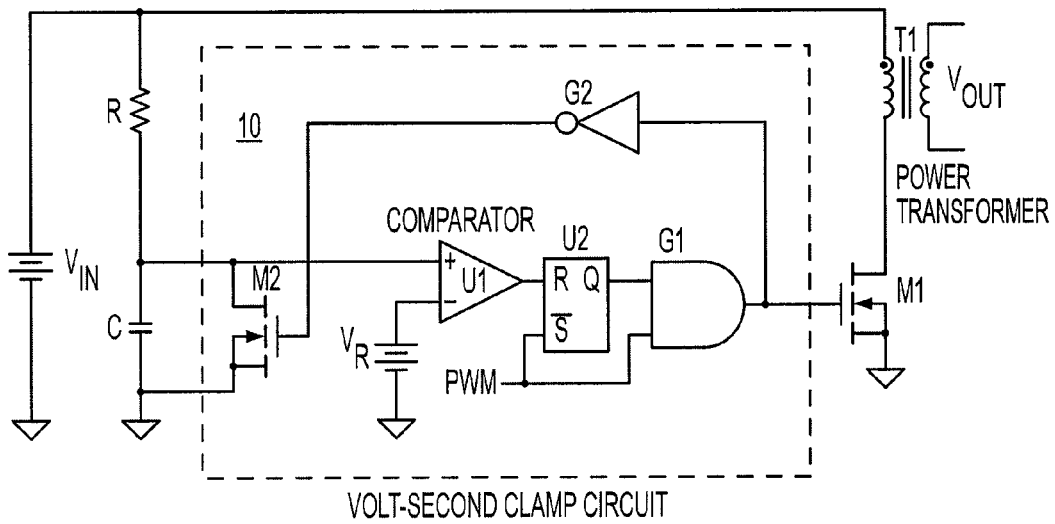
FIGS. 1-3 are circuit diagrams illustrating conventional volt-second clamp circuits.

As shown above in connection with FIG. 1, the on-time of the switch M1 is limited to an amount of volt-second clamp time $t_{CL}$, given by:

$$t_{CL} = RC \cdot \ln\left(\frac{V_{IN}}{V_{IN} - V_R}\right).$$

In the above equation, if the reference voltage $V_R$ were to be adjusted as a function of $V_{IN}$, such that:

$$V_R = V_{IN}\left(1 - e^{\frac{-V_{R1}}{V_{IN}}}\right)$$

where $V_{R1}$ is a fixed reference voltage, then substituting this expression for $V_R$ into the above equation for $t_{CL}$ gives $$t_{CL} = RC \cdot \left(\frac{V_{R1}}{V_{IN}}\right).$$

Figure 5:
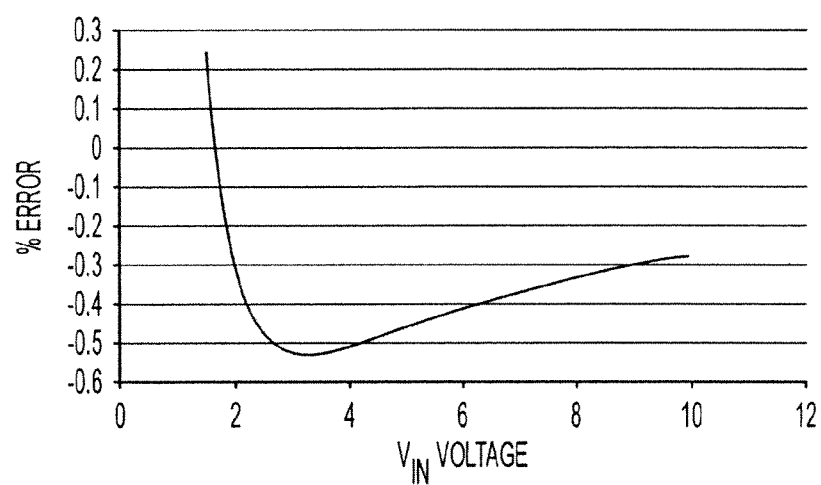
FIG. 5 illustrates the accuracy of the volt-second clamp circuit in FIG. 4.

While implementing the above expression for $V_R$ in a circuit design would be difficult, it can be approximated by using:

$$V_R = V_{R1} - \frac{K}{V_{IN}}$$

where $V_{R1}$ is a fixed reference voltage, and K is a constant that can be calculated or empirically determined for a best fit approximation to the exponential. Using this approximation results in a reference voltage that is typically within 1% of the desired exponential ideal. As an example, if $V_{IN}$ varies between 1.5V and 10V, and a fixed reference voltage $V_{R1}$ of 0.6V is used, then a value of K=0.16 will result in a deviation from the ideal exponential that is less than 0.6% over this range of $V_{IN}$, as shown in FIG. 5.

To produce the variable reference voltage $V_R$ at the negative input of the comparator U1, the volt-second clamp circuit 40 includes a multiplier/divider circuit 42 configured to produce a value of C=A/B, where A represents a selected value of the constant K, and B represents the input voltage V. The produced value C is supplied to an adder/subtractor circuit 44 that subtracts the value C from a fixed reference value $V_{R1}$. The output of the adder/subtractor circuit 44 represents the variable reference value $V_R$ supplied to the negative input of the comparator U1.

Hence, the volt-second claim circuit of the present disclosure compares a value at the input of the comparator U1 with a variable reference value $V_R$ produced as a function of the input voltage $V_{IN}$, for example, by adjusting a fixed reference value $V_{R1}$ by an amount inversely proportional to the input voltage $V_{IN}$. In this circuit, the accuracy of the clamp is only minimally impacted when the input voltage $V_{IN}$ gets low relative to the reference voltage $V_R$. Prior art approaches use an analog multiplier to replace the entire RC charging circuit, thereby introducing unnecessary inaccuracies. In the present disclosure, the multiplier/divider is only used to create a correction to the reference voltage, so that the accuracy of the multiplier/divider is not especially critical. In addition, since an external capacitor is used in the RC charging circuit, the volt-second clamp of the present disclosure does not suffer from the inaccuracy associated with an integrated circuit capacitor. Finally, since no feedback loop is used, the circuit response is essentially instantaneous, maintaining a cycle-by-cycle control of the volt-seconds applied to the transformer T1.

Figure 2:
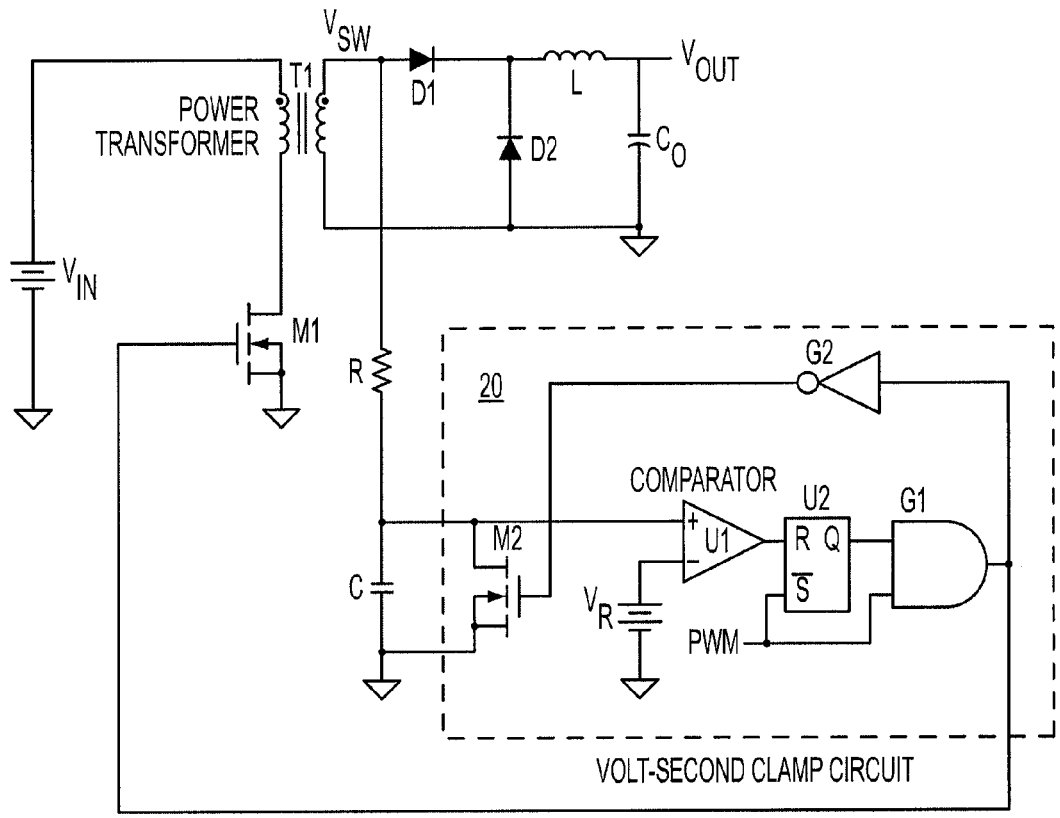
Figure 3:
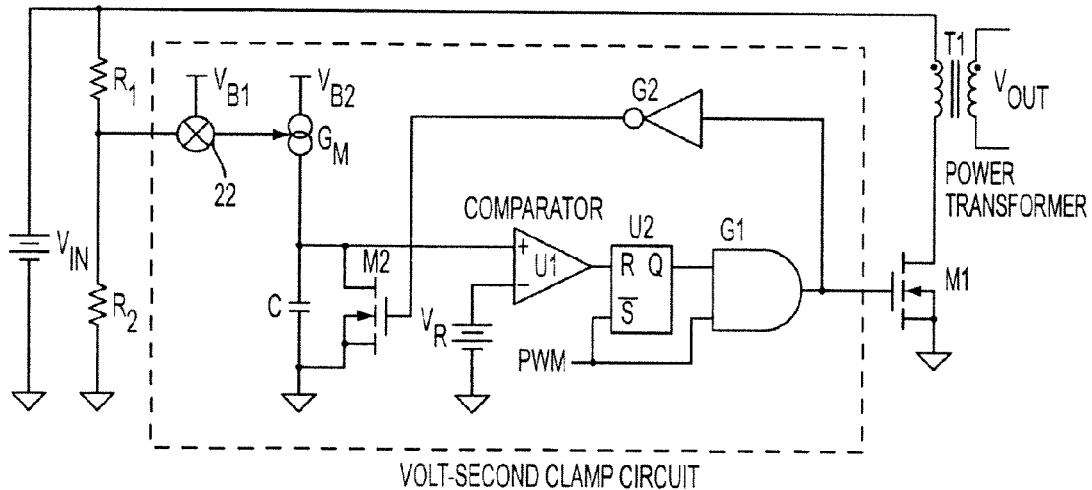

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. For example, although FIG. 4 shows a volt-second clamp circuit provided on the primary side of the transformer T1, the present disclosure is also applicable to improving the accuracy of a volt-second clamp circuit arranged at the secondary side of the transformer T1, such as a circuit illustrated in FIG. 2.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A DC/DC conversion system configured for producing an output voltage in response to an input voltage and having a transformer with a primary winding responsive to the input voltage and a secondary winding for producing the output voltage, comprising:
    a power switch coupled to the primary winding of the transformer and controlled with a converter control signal,
    a comparator for comparing an input value supplied to the comparator with a variable reference value to limit on-time of the power switch so as to prevent the magnetic flux density of the transformer from increasing to an undesired level,
    a comparator input circuit including an RC circuit supplied with the input voltage for producing the input value of the comparator representing a product of the input voltage and the on-time of the power switch, and
    a reference circuit for producing the variable reference value that varies as a function of the input voltage.

2. The system of claim 1, wherein the reference circuit is configured for producing the variable reference value based on a reference adjustment value inversely proportional to the input voltage.

3. The system of claim 2, wherein the reference circuit is configured for producing the reference adjustment value by dividing a pre-selected constant value by a value of the input voltage.

4. The system of claim 3, wherein the reference circuit is configured for subtracting the reference adjustment value from a fixed reference value to produce the variable reference value.

5. The system of claim 1, wherein the comparator is arranged on an integrated circuit and the comparator input circuit includes a capacitor arranged externally with respect to the integrated circuit.

6. The system of claim 5, wherein the comparator input circuit further includes a switch responsive to an output signal of the comparator to control charging of the capacitor.

7. A system for controlling a circuit having a transformer arranged between input circuitry and output circuitry to galvanically isolate the output circuitry from the input circuitry, the system comprising:
    a power switch controlled to apply voltage to the transformer,
    a switch control circuit responsive to a difference between a variable control value and a variable reference value to limit on-time of the power switch so as to prevent the magnetic flux density of the transformer from increasing to an undesired level,
    a control value generating circuit including an RC circuit supplied with the voltage applied to the transformer, the RC circuit being configured for producing the control value representing a product of the voltage applied to the transformer and the on-time of the power switch, and
    a reference circuit for producing the reference value that varies as a function of the voltage applied to the transformer.

8. The system of claim 7, wherein the reference circuit is configured for producing the variable reference value based on a reference adjustment value inversely proportional to the voltage applied to the transformer.

9. The system of claim 8, wherein the reference circuit is configured for producing the reference adjustment value by dividing a pre-selected constant value by a value of the voltage applied to the transformer.

10. The system of claim 9, wherein the reference circuit is configured for subtracting the reference adjustment value from a fixed reference value to produce the variable reference value.

11. The system of claim 7, wherein the switch control circuit is arranged on an integrated circuit and the control value generating circuit includes a capacitor arranged externally with respect to the integrated circuit.

12. The system of claim 11, wherein the control value generating circuit further includes a switch responsive to an output signal of the switch control circuit to control charging of the capacitor.

13. A method for limiting magnetic flux density in a transformer used to galvanically isolate an output of a DC/DC converter from an input voltage, the method comprising the steps of:
    producing a control value representing a product of the input voltage and an on-time of a switch that controls the DC/DC converter,
    producing a variable reference value as a function of the input voltage, and
    based on a difference between the control value and the variable reference value, limiting the on-time of the switch to prevent the magnetic flux density of the transformer from increasing to an undesired level.

14. The method of claim 13, wherein the variable reference value is produced based on a reference adjustment value inversely proportional to the input voltage.

15. The method of claim 14, wherein the reference adjustment value is produced by dividing a pre-selected constant value by a value of the input voltage.

16. The method of claim 15, wherein the variable reference value is produced by subtracting the reference adjustment value from a fixed reference value.

17. A DC/DC conversion system configured for producing an output voltage in response to an input voltage and having a transformer with a primary winding responsive to the input voltage and a secondary winding for producing the output voltage, comprising:
   a power switch coupled to the primary winding of the transformer and controlled with a converter control signal,
   a comparator for comparing an input value supplied to the comparator with a variable reference value to control the power switch so as to prevent the magnetic flux density of the transformer from increasing to an undesired level,
   a comparator input circuit for producing the input value of the comparator as a function of the input voltage and an on-time of the power switch, and
   a reference circuit for producing the variable reference value that varies as a function of the input voltage,
   wherein the reference circuit is configured for:
   producing the variable reference value based on a reference adjustment value inversely proportional to the input voltage,
   producing the reference adjustment value by dividing a pre-selected constant value by a value of the input voltage, and
   subtracting the reference adjustment value from a fixed reference value to produce the variable reference value.

18. A system for controlling a circuit having a transformer arranged between input circuitry and output circuitry to galvanically isolate the output circuitry from the input circuitry, the system comprising:
   a power switch controlled to apply voltage to the transformer,
   a switch control circuit responsive to a difference between a variable control value and a variable reference value to control the power switch so as to control the voltage applied to the transformer,
   a control value generating circuit for producing the control value as a function of the voltage applied to the transformer and an on-time of the power switch, and
   a reference circuit for producing the reference value that varies as a function of the voltage applied to the transformer,
   wherein the reference circuit is configured for:
   producing the variable reference value based on a reference adjustment value inversely proportional to the voltage applied to the transformer,
   producing the reference adjustment value by dividing a pre-selected constant value by a value of the voltage applied to the transformer, and
   subtracting the reference adjustment value from a fixed reference value to produce the variable reference value.

19. A method for limiting magnetic flux density in a transformer used to galvanically isolate an output of a DC/DC converter from an input voltage, the method comprising the steps of:
   producing a control value as a function of the input voltage and an on-time of a switch that controls the DC/DC converter,
   producing a variable reference value as a function of the input voltage, and
   based on a difference between the control value and the variable reference value, controlling the supply of the input voltage to the transformer,
   wherein the variable reference value is produced based on a reference adjustment value inversely proportional to the input voltage,
   the reference adjustment value is produced by dividing a pre-selected constant value by a value of the input voltage, and
   the variable reference value is produced by subtracting the reference adjustment value from a fixed reference value.

* * * * *